United States Patent [19]

Burlow

[11] 3,843,783

[45] Oct. 22, 1974

[54] RODENTICIDAL COMPOSITIONS AND PROCESSES EMPLOYING GELATINIZED AMYLACEOUS MATERIALS

[75] Inventor: Stanley N. Burlow, Chicago, Ill.

[73] Assignee: Velsicol Chemical Corporation, Chicago, Ill.

[22] Filed: Nov. 8, 1971

[21] Appl. No.: 196,738

[52] U.S. Cl.................... 424/84, 424/283, 424/331
[51] Int. Cl............................................ A01n 17/14
[58] Field of Search...................... 424/84, 283, 331

[56] References Cited
FOREIGN PATENTS OR APPLICATIONS
756,698    9/1956   Great Britain....................... 424/84

OTHER PUBLICATIONS

Chemical Abstracts, Vol. 49, (1955), p. 1272g.

Soriano, P., Philippine Jour. of Ag., Vol. 23, (114)(1962), pgs. 45–54.

Primary Examiner—Vincent D. Turner
Attorney, Agent, or Firm—Robert J. Schwarz; Dietmar H. Olesch

[57] ABSTRACT

This invention discloses water-resistant rodenticide compositions comprising a gelatinized compacted amylaceous material having a water content below about 14 percent by weight of the total composition in admixture with a rodenticidal amount of a rodenticide. Further disclosed is a process for the preparation of the above described compositions.

11 Claims, No Drawings

RODENTICIDAL COMPOSITIONS AND PROCESSES EMPLOYING GELATINIZED AMYLACEOUS MATERIALS

This invention relates to improved rodenticide compositions and more particularly relates to water-resistant rodenticide pellets.

Rodenticides and particularly poisons used for controlling rats and mice are typically formulated into food baits. These food baits are often in the form of hard pellets which can be conveniently handled and are acceptable to rodents. Such pellets are made by agglomerating ground cereal grains in combination with the toxicant. Sugar when used as the agglomerating agent also imparts improved acceptability to the product. Additional flavoring agents as well as preservatives are also incorporated into the bait.

While the described bait compositions have proven to be successful, they have in the past suffered from physical breakdown upon exposure to high humidity or excessive moisture. To avoid breakdown of the pellets and to enable their use, outdoors wax has been added to the pellets. The use of wax has improved the moisture and water resistance of bait pellets but has not proven to be entirely satisfactory. Only minor amounts of wax can be used while preserving the acceptability of the bait by rodents. Such amounts of wax do not impart the degree of water resistance desired in a product used under moist conditions.

It has now been found that rodent bait pellets having excellent water resistance can be prepared without the use of wax. More specifically it has been found that a water-resistant rodenticide pellet can be readily prepared by utilizing a gelatinized amylaceous material as the carrier.

Thus, one embodiment of the present invention resides in a water-resistant rodenticide pellet comprising a gelatinized compacted amylaceous material having a water content below about 14 percent by weight based on the total composition in admixture with a rodenticidal amount of rodenticide.

The particular rodenticide which is used in the compositions of the present invention is not critical and the well-known stomach poisons and anticoagulants can be employed. Preferred rodenticides useful in this invention are 3-(α-acetonylbenzyl)-4-hydroxycoumarin, 2-di-phenylacetyl-1,3-indandione and the alkali metal, ammonia and amine salts thereof.

Exemplary alkali metal salts are the sodium salt of 2-diphenylacetyl-1,3-indandione and the potassium salt of 2-diphenylacetyl-1,3-indanedione. Exemplary amine salts are the trimethylamine salt of 2-diphenylacetyl-1,3-indandione, the triethylamine salt of 2-diphenylacetyl-1,3-indandione, the dimethylamine salt of 2-diphenylacetyl-1,3-indandione, the propylamine salt of 2-diphenylacetyl-1,3-indandione and the like.

The amount of rodenticide which can be used in the composition will vary somewhat with the particular toxicant employed. Generally an amount of from about 0.0005 to about 0.1 percent by weight based on the total composition is used.

The amylaceous material which can be used in the rodenticide pellet of this invention can comprise any comminuted vegetable material consisting predominantly of starch. Particularly useful are ground cereal grains such as corn meal, oat meal, wheat flour, sorgum, waxy maize, mixtures thereof and the like. Starch itself such as corn starch can also be used as the amylaceous component of the pellets.

The amylaceous material is preferably in a finely divided particulate state such as in the form of a flour or finely ground meal. A particle size range capable of passing through a 50 to 100 mesh screen is most preferred.

As previously indicated, the amylaceous material must be gelatinized in order to impart the desired physical properties to the pellets of this invention. This gelatinization can be effected by a heat treatment or a combination of heat treatment with mechanical shear in the presence of water as will be hereinafter described in greater detail. Upon completion of the gelatinization, the product is compacted and the water content is reduced to below about 14 percent by weight of the total composition to produce a hard, water-resistant pellet.

The rodenticide pellets of this invention are prepared by a process which results in the surprising water resistance of the final product. Thus, a further embodiment of the present invention resides in a process for preparing a water-resistant rodenticide pellet which comprises:

(a) mixing a rodenticidal amount of a rodenticide and amylaceous material to provide a blend;

(b) gelatinizing the amylaceous portion of the blend in the presence of sufficient water to provide a doughy mass;

(c) compacting the gelatinized blend; and (d) drying the compacted product to a moisture content below about 14 percent by weight.

To effect the process of the present invention, the rodenticide and amylaceous material are first mixed into a blend to insure a substantially homogeneous dispersion of the toxicant in the product. This mixing can be carried out in standard mixing equipment such as ribbon blenders and the like.

The blend is subjected to gelatinization conditions capable of gelatinizing the amylaceous material contained therein. The gelatinization can be effected by various means. One method of gelatinizing the blend is by subjecting the blend to pressure cooking in the presence of from about 15 to about 25 percent water based on the weight of said blend. Such pressure cooking comprises heating the blend to temperatures ranging from 215° to about 350°F under superatmospheric pressure for a sufficient time to disrupt the starch granules contained in the amylaceous material.

The gelatinization can also be effected by subjecting the amylaceous mixture to mechanical shear forces in addition to heating at a temperature from about 160° to 300° F. Preferrably the application of shear force and heating of the amylaceous mass are performed in the presence of from about 15 to about 25 percent moisture. The simultaneous heating and application of mechanical shear forces can be readily accomplished through the use of high shear force blending, kneading or extruding equipment which is provided with heating means. Steam jacketed sigma blade blenders, dough mixers, kneader or extruder which force the product through a restricted orifice can be suitably employed.

The exact degree of gelatinization of the amylaceous material is not critical provided a substantial disruption of the starch granules in the amylaceous material is achieved. The degree of gelatinization will have an effect on the water resistance of the final product. Generally, a greater degree of gelatinization provides a final product of increased water resistance.

Upon completion of the gelatinization step of the process of the present invention the gelatiized blend is subjected to a compacting step. This compacting step is essential to impart water resistance to the rodenticide compositions of this invention. The compacting step generally comprises subjecting the gelatinized blend to mechanical pressure sufficient to form a substantially continuous composition. This compacting step can be carried out by subjecting the blend to mechanical pressure in a die of suitable dimensions to form a pellet of a desired shape. Pressures ranging from about 15 to about 25,000 per square inch can be effectively used. Typically, the higher pressures result in a product of greater water resistance.

The compacting step of the process of the present invention can also be carried out through the use of compacting rolls. These compacting rolls typically comprise two facing steel cylinders having cavities on their peripheral surfaces. The cylinders rotate towards each other at a synchronized rate such that the cavities on the surface of the cylinders directly oppose each other during rotation. The distance between the two cylinders can be varied thereby providing different compacting pressures. When using the compacting rolls the gelatinized blend heretofore described is fed into the rolls and is thereby formed into pellets having the configuration of the cavities in the cylinders.

The compacting rolls can also be corrugated rolls or cylinders having a corrugated or fluted surface in an axial direction. Such corrugated rolls permit the formation of rodenticide compositions in the form of flakes of varying thickness.

Upon completion of the compacting step, the product is dried to a moisture content below 14 percent by weight of the composition. Preferably the composition is dried to a moisture content ranging from about 5 to about 12 percent by weight of the composition. The drying step can be conveniently carried out by conventional drying equipment such as forced air heating ovens and the like.

In addition to the essential ingredients of the rodenticide compositions of this invention, namely, the toxicant and the amylaceous materials herein described, it is often desirable to incorporate other additives including binding agents, flavoring agents, preservatives and the like.

Binding agents can comprise saccharides or polysaccharides such as sucrose, dextrose, maltose, dehydrated corn syrups, dextrin, starch hydrolyzates, gelatin, guar gum, carboxymethyl cellulose, sodium alginate and the like.

Preservatives can comprise any of the common preservatives used in foods to retard spoilage or decomposition of the product. Bacteriacides and fungicides can be effectively used. Exemplary preservatives are malathion, sodium benzoate, butylated hydroxytoluene (BHT) and the like.

It is desirable to incorporate the flavoring agents into the rodenticide compositions of this invention for the purpose of improving the acceptability of the compositions to rodents. For example, proteinaceous material such as fish meal, soya meal and whey solids can be efficaciously used. Artificial flavoring agents capable of imparting meat flavors, cheese flavors and the like can be used. Furthermore, flavor enhancers such as sodium chloride and monosodium glutamate can also be employed.

The preparation of the rodenticide compositions of this invention is more specifically illustrated in the following examples.

EXAMPLE 1

Preparation of Water-Resistant Rodenticide Pellets

The following ingredients were heated and charged into a ribbon blender and were mixed into a uniform blend. The quantities are in parts by weight.

| INGREDIENTS | AMOUNT |
| --- | --- |
| 2-diphenylacetyl-1,3-indandione | 0.005 |
| powdered sugar | 4.995 |
| malathion | 0.010 |
| sodium benzoate | 0.300 |
| butylated hydroxytoluene | 0.100 |
| sodium chloride | 1.000 |
| fish meal | 4.000 |
| soya meal | 10.000 |
| steel cut oats | 20.000 |
| corn meal | 59.590 |

Heating and blending of the mixture was continued and sufficient water was added to raise the total moisture content of the mixture to about 18 percent by weight. This mixture was then charged into a dough mixer maintained at a temperature of about 210°F and was subjected to heat and mechanical shear until gelatinization of the amylaceous material was effected. The gelatinized product was then pelletized utilizing compacting rolls to provide pillow shaped pellets of a light brown color. The pellets had a moisture content of about 18 percent by weight. The pellets were then dried in a forced air oven until the moisture content was reduced to from about 8 to 9 percent by weight to yield a desired rodenticide composition of this invention.

EXAMPLE 2

Preparation of Water-Resistant Rodenticide Flakes

The following ingredients are ground to a particle size capable of passing through a 50 mesh screen:

| INGREDIENTS | AMOUNT PARTS BY WEIGHT |
| --- | --- |
| whole ground corn | 60.0 |
| steel cut oats | 20.0 |
| baker's fine sugar | 5.0 |
| soya meal | 10.0 |
| fish meal | 4.0 |
| salt | 1.0 |
| 3-(α-acetonylbenzyl)-4-hydroxy-coumarin | 0.1 |

The ingredients are then blended in a Hobart mixer until uniform. Water in an amount sufficient to provide a total moisture content of about 25 percent by weight is added to the mixture. The resulting mixture is then charged into a pressure vessel and is heated to a temperature of about 350°F for a period of about 2 hours. After this time the mixture is compacted by passing it through corrugated rolls capable of exerting a pressure of about 1,000 pounds per linear inch. The resulting product is then dried in a forced air oven to a moisture content of about 14 percent to yield the desired water-resistant rodenticide flakes.

EXAMPLE 3

Preparation of Water-Resistant Rodenticide Pellets

The following ingredients are ground to a particle size capable of passing through a 100 mesh screen and are charged into a ribbon blender.

| INGREDIENT | AMOUNT PARTS BY WEIGHT |
| --- | --- |
| sodium salt of 2-diphenylacetyl-1,3-indandione | 0.0005 |
| wheat flour | 85.0 |
| soya meal | 10.0 |
| dextrose | 5.0 |

The ingredients are mixed into a uniform blend. Water in an amount sufficient to provide a total moisture content of about 15 percent by weight of the blend is added. The resulting blend is then gelatinized by subjecting it to the action of a sigma blade blender at a temperature of about 210°F for a period of about 2 hours. After this time the gelatinized product is placed in dies to a mechanical pressure of about 25,000 pounds per square inch. The resulting compacted product is then dried to a moisture content of about 12 percent to yield the desired water-resistant rodenticide pellets.

I claim:

1. A water-resistant rodenticide composition comprising a gelatinized, compacted amylaceous material consisting of ground cereal grain having a water content of from about 5 to about 12 percent by weight based on the total composition in admixture with a rodenticidal amount of a rodenticide.

2. The rodenticide composition of claim 1 wherein the amylaceous material comprises corn meal.

3. The rodenticidal composition of claim 1 wherein the rodenticide is selected from the group consisting of 3-(α-acetonylbenzyl)-4-hydroxycoumarin, 2-diphenylacetyl-1,3-indandione and the sodium, potassium, ammonia or amine salts of said indandione.

4. The rodenticide composition of claim 3 wherein the rodenticide comprises from about 0.0005 to about 0.1 percent by weight based on the total composition.

5. The rodenticidal composition of claim 1 which in addition contains at least one flavoring agent selected from the group consisting of sugar, sodium chloride, fish meal and soya meal.

6. A process for the preparation of the water-resistant rodenticide composition of claim 1 which comprises
  a. mixing a rodenticidal amount of a rodenticide and amylaceous material consisting of ground cereal grain to provide a blend;
  b. gelatinizing the amylaceous portion of the blend in the presence of sufficient water to provide a doughy mass;
  c. compacting the gelatinized blend; and
  d. drying the compacted product to a moisture content of from about 5 to about 12 percent by weight.

7. The process of claim 6 wherein the gelatinization is performed in the presence of from about 15 to about 25 percent water based on the weight of the blend.

8. The process of claim 6 wherein the rodenticide is selected from the group consisting of 3-(α-acetonylbenzyl-4-hydroxycoumarin, 2-diphenylacetyl-1,3-indiandione and the sodium, potassium, ammonia and amine salts of said indandione.

9. The process of claim 6 wherein the rodenticidal amount is from about 0.0005 to about 0.1 percent by weight of the rodenticide composition.

10. The process of claim 6 where gelatinizing comprises heating the blend to a temperature from about 160° to about 300°F while subjecting said blend to mechanical shear.

11. The process of claim 6 wherein compacting comprises subjecting the gelatinized blend to mechanical pressure ranging from about 15 to about 25,000 pounds per square inch.

* * * * *